US008140575B2

(12) United States Patent
Ishihara et al.

(10) Patent No.: US 8,140,575 B2
(45) Date of Patent: Mar. 20, 2012

(54) APPARATUS, METHOD, AND PROGRAM PRODUCT FOR INFORMATION PROCESSING

(75) Inventors: Tatsuya Ishihara, Yamato (JP); Hisashi Miyashita, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/688,998

(22) Filed: Mar. 21, 2007

(65) Prior Publication Data

US 2007/0233696 A1 Oct. 4, 2007

(30) Foreign Application Priority Data

Apr. 3, 2006 (JP) ................................. 2006-102227

(51) Int. Cl.
*G06F 7/00* (2006.01)
*G06F 17/30* (2006.01)
(52) U.S. Cl. ................. 707/781; 707/797; 707/956
(58) Field of Classification Search .............. 707/10
See application file for complete search history.

(56) References Cited

U.S. PATENT DOCUMENTS

| | | | | |
|---|---|---|---|---|
| 7,065,706 B1 * | 6/2006 | Sankar | ........................ | 715/234 |
| 7,472,349 B1 * | 12/2008 | Srivastava et al. | .................. | 1/1 |
| 2001/0034733 A1 * | 10/2001 | Prompt et al. | ................ | 707/102 |
| 2002/0184373 A1 * | 12/2002 | Maes | ........................... | 709/228 |
| 2003/0126136 A1 * | 7/2003 | Omoigui | ........................ | 707/10 |
| 2003/0225894 A1 * | 12/2003 | Ito | ............................... | 709/227 |
| 2004/0068731 A1 * | 4/2004 | Davis et al. | .................. | 719/310 |
| 2004/0143577 A1 * | 7/2004 | Shalabi et al. | ................. | 707/10 |
| 2005/0198394 A1 * | 9/2005 | Waldorf et al. | ............... | 709/246 |
| 2005/0203957 A1 * | 9/2005 | Wang et al. | ................ | 707/104.1 |
| 2005/0234928 A1 * | 10/2005 | Shkvarchuk et al. | ......... | 707/100 |
| 2005/0256882 A1 * | 11/2005 | Able et al. | ....................... | 707/10 |
| 2006/0005070 A1 * | 1/2006 | Zimmer et al. | ................... | 714/5 |
| 2006/0230023 A1 * | 10/2006 | Erickson et al. | ................. | 707/3 |
| 2006/0271537 A1 * | 11/2006 | Chandrasekharan et al. | .... | 707/7 |
| 2007/0038643 A1 * | 2/2007 | Epstein | .......................... | 707/10 |
| 2007/0061382 A1 * | 3/2007 | Davis et al. | .................... | 707/201 |
| 2007/0078840 A1 * | 4/2007 | Stern et al. | ....................... | 707/4 |
| 2007/0112803 A1 * | 5/2007 | Pettovello | .................... | 707/100 |
| 2007/0143434 A1 * | 6/2007 | Daigle | ........................... | 709/207 |
| 2007/0168336 A1 * | 7/2007 | Ransil et al. | ..................... | 707/3 |

OTHER PUBLICATIONS

Andrew Harrison, Ian J. Taylor, "WSPeer—An Interface to Web Service Hosting and Invocation," Workshop Apr. 2005. ipdps, vol. 5, pp. 175a, 19th IEEE International Parallel and Distributed Processing Symposium (IPDPS'05) -.*

(Continued)

*Primary Examiner* — Mohammad Ali
*Assistant Examiner* — Kannan Shanmugasundaram
(74) *Attorney, Agent, or Firm* — Mollborn Patents, Inc.; Fredrik Mollborn (57) ABSTRACT

Methods and apparatus, including computer program products, implementing and using techniques for providing an interface for using a web service on an external server device. A first tree structure used for using the web service is stored. A request message calling up a web service is generated in response to having received access to a request node in the first tree structure. The request node is used for accessing the web service corresponding to the request node. The request message is sent to the server device providing the web service. A response message, including a result of having executed the web service from the server device, is received. The result of the web service execution is reflected in a response node in the first tree structure for storing the result of the web service.

21 Claims, 8 Drawing Sheets

OTHER PUBLICATIONS

A. Harrison and I. Taylor. "Dynamic Web Service Deployment, Using WSPeer." Feb. 2005. In Proceedings of 13th Annual Mardi Gras Conference—Frontiers of Grid Applications and Technologies, pp. 11-16.*

Nicola Onose, Jerome Simeon, XQuery at your web service, Proceedings of the 13th international conference on World Wide Web, May 17-20, 2004, New York, NY, USA.*

G. Fox, et al., "A Demonstration of Collaborative Web Services and Peer-to-Peer Grids", U.S., 2003, In Collaborative Technologies Symposium.

H. Kreger, "Web Services Conceptual Architecture (WSCA 1.0) Technical report", [online], May 2001, IBM Software Group, [Search Date Mar. 30, 2006], Internet <URL:http://www-306.ibm.com/software/solutions/webservices/pdf/WSCA.pdf>.

S. Loughran and E. Smith, "Rethinking the Java SOAP Stack", U.S., 2005, in ICWS, p. 845-852.

X. Qiu, et al., "Internet Collaboration Using the W3C Document Object Model", U.S., 2003, In International Conference on Internet Computing, pp. 643-647.

* cited by examiner

(A)
```
<ns1:doGetCachedPage xmlns:ns1="urn:WebSearch">
    <key xsi:type="xsd:string">0000</key>
     <url xsi:type="xsd:string">http://www.aaaaaa.com/</url>
</ns1:doGetCachedPage>
```

(B)
```
doGetCachedPage[key=' 0000' and url=' http://www.aaaaaa.com/' ]
```

FIG. 5

```
<transformations xmlns="urn:example:webdrasil"
          xmlns:xsl="http://www.w3.org/1999/XSL/Transform">
  <request name="doGetCachedPage">
    <predicate cond="doGetCachedPage[key='0000']"/>
    <transformation target=".">
      <xsl:stylesheet>
        ...
      </xsl:stylesheet>
    </transformation>
  </request>
  <request name="doWebSearch">
    <transformation target="/">
      <xsl:stylesheet>
        ...
      </xsl:stylesheet>
    </transformation>
  </request>
</transformations>
```

```
var doGetCachedPage =
webService.selectSingleNode(" ./ws:Query[1]/ws:Request/gws:doGetCachedPage
     [key=' GOOG' and url=' http://www.ibm.com ']", webService);
```

FIG. 9A

```
var textNode = response.selectSingleNode
     (" ./gws:doGetCachedPageResponse/return[1]/text()[1]", response);
```

APPARATUS, METHOD, AND PROGRAM PRODUCT FOR INFORMATION PROCESSING

CROSS-REFERENCE TO RELATED APPLICATIONS

This application claims priority under 35 U.S.C. 119(a)-(d) from Japanese Patent Application No. JP2006-102227 entitled "APPARATUS, METHOD AND PROGRAM PRODUCT FOR INFORMATION PROCESSING" filed Apr. 3, 2006, the entire disclosure of which is incorporated herein by reference for all purposes.

BACKGROUND

This invention relates generally to information processing. More specifically, the invention relates to providing an interface for using a web service on an external server device.

A web service is an application component accessed via the Internet. An information processing apparatus can provide a distributed component environment through a network by using the web service on an external server device. The information processing apparatus using the web service sends out a SOAP message in a format corresponding to the web service and receives a response from the web service. Conventionally, a program executed by the information processing apparatus using the web service generates a request message, and receives and interprets the same in the web service, using an OOP (Object-Oriented Programming) model.

A HTML (Hypertext Markup Language) document or an XML (eXtensible Markup Language) document, for example, which is used by a web browser application (hereinafter, simply referred to as a browser), is created based on a tree structure model, such as the DOM (Document Object Model).

A programming model for the web service based on the OOP model is described in, for example, H. Kreger, "Web services conceptual architecture (wsca 1.0). Technical report", May, 2001, IBM Software Group, Internet <URL: http://www-306.ibm.com/software/solutions/webservices/pdf/WSCA.pdf> and in S. Loughran and E. Smith, "Rethinking the Java SOAP stack", U.S., 2005, In ICWS, P. 845-852. The operation of the DOM (Document Object Model) as a web service is described in, for example, G. Fox, H, Bulut, K. Kim, S.-H. Ko, S. Lee, S. Oh, S. Pallickara, X. Qiu A. Uyar, M. Wang, and W. Wu, "Collaborative web services and peer-to-peer girds", U.S., 2003, In Collaborative Technologies Symposium, and in X. Qiu, B. Carpenter, and G. Fox, "Internet collaboration using the w3c document object model", U.S., 2003, In International Conference on Internet Computing, pages 643-647.

SUMMARY

In general, in one aspect, the invention provides methods and apparatus, including computer program products, implementing and using techniques for providing an interface for using a web service on an external server device. A first tree structure used for using the web service is stored. A request message calling up a web service is generated in response to having received access to a request node in the first tree structure. The request node is used for accessing the web service corresponding to the request node. The request message is sent to the server device providing the web service. A response message, including a result of having executed the web service from the server device, is received. The result of the web service execution is reflected in a response node in the first tree structure which stores the result of the web service.

Advantageous implementations can include one or more of the following features. An application execution unit can execute an application using the web service and a second storage unit can store a document used by the application in a second tree structure. The application execution unit can replicate a partial tree in the first tree structure including the at least one response node in which the result of the web service is reflected as a partial tree into the second tree structure.

An application execution unit can execute an application using the web service and the storage unit can store a document used by the application with the first tree structure. The application execution unit, as a result of having used the web service for part of the document, can access the request node in the first tree structure, where the first tree structure is defined corresponding to the part of the document. The response reflection unit can reflect the result of having executed the web service in the part of the document.

The first storage unit can store the first tree structure, which has a partial tree for request accessed for executing a request to the web service and a partial tree for response reflecting the result of the web service. The request generation unit can generate the request message in response to accessing the request node in the partial tree for request, and the response reflection unit can reflect the result of having executed the web service in the response node in the partial tree for response.

An application execution unit can execute the application using the web service. The application execution unit can set each parameter provided to the web service for the parameter nodes corresponding to each parameter in the first tree structure. The request generation unit can acquire the parameter from each of the parameter nodes to which the parameters are set by the application execution unit to generate the request message including the parameters.

The request generation unit can generate a request message in response to having accessed the request node with a path indicating a position in the first tree structure. The application execution unit can set each parameter provided to the web service to each of the parameter nodes descended from the request nodes defined corresponding to the web services. The request generation unit can include a service name acquisition unit which can acquire a name of the web service from the request node, a WSDL acquisition unit which can acquire a WSDL (Web Services Description Language) description defining a specification of the web service using the name of the web service, and an address acquisition unit which can acquire an address of the server device which provides the web service from the WSDL description. The request sending unit can send the request message to the address acquired by the address acquisition unit.

The first storage unit can cache the response node in which the result of the web service is reflected. The first storage unit can include a cache hit processing unit for returning the result of the web service cached on the first storage unit, if the request nodes have already been registered in the first tree structure, and a cache miss processing unit for causing the request sending unit to send the request message in order to cache the result of the web service on the first storing unit, and to register anew the request nodes as nodes in the first tree structure, when the request nodes have not been registered in the first tree structure.

The request generation unit can generate the request message in response to accessing the response node after accessing the request node. A conversion rule storage unit can store a conversion rule to convert the response message received complying with having accessed the request node in response to the each request node. A conversion unit can convert the first tree structure in which the result of the web service included in the response message has been reflected based on the conversion rule corresponding to the response message.

The invention can be implemented to include one or more of the following advantages. Since it is possible to use a web service through an access to a node in a tree structure, this enables to readily use the web service on a server device.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

As is known, browsers and creation tools for HTML documents are widely used. Often a user uses the browser as a client application of a web service. However, when using the browser as the client application of a web service, the user must create a document based on a tree structure model and create an access program to the web service based on the OOP model, which has resulted in a large burden due to handling different programming models.

The various embodiments of the invention described herein provide an information processing apparatus, methods and computer program products, which can solve the above problems. The invention will be described below by way of example. However, it should be noted that the embodiments below do not limit the invention as defined in the claims, and that the combinations of the features described in the embodiments below are not necessarily essential.

Figure 1:
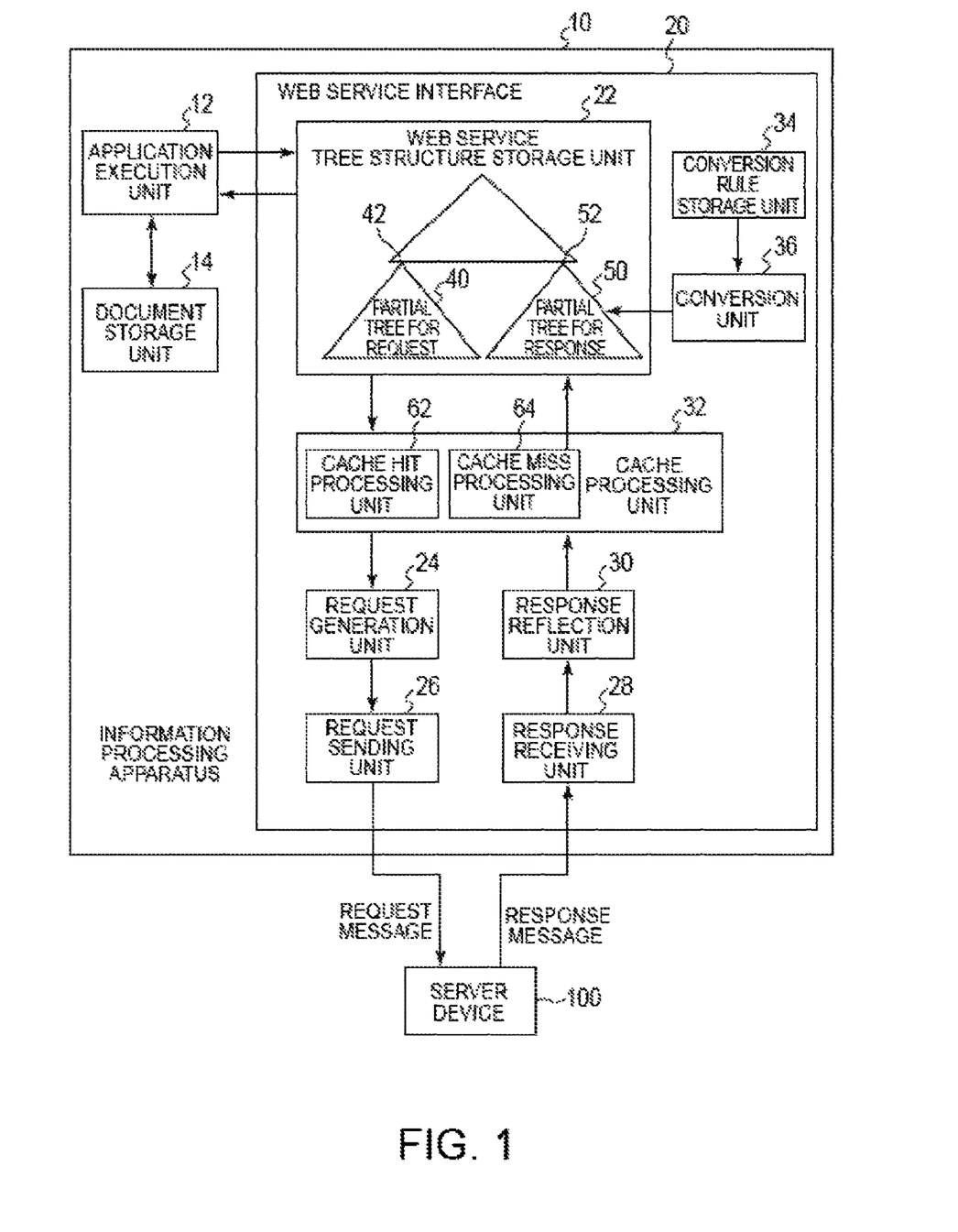
FIG. 1 shows an information processing apparatus along with a server device in accordance with one embodiment of the invention.

FIG. 1 is a schematic bock diagram of an information processing apparatus 10 in accordance with one embodiment of the invention. A server device 100 stores a web service which is an application component accessed from an external device using the Internet. The server device 100 executes the web service when the server device 100 receives a request message in accordance with the SOAP from the information processing apparatus 10. When completing execution of the web service, the server device 100 returns a response message that includes a result of having executed the web service to the information processing apparatus 10 in accordance with the SOAP. Since the web service adopts an XML interface, the web service is also referred to as an XML web service.

While executing an application, the information processing apparatus 10 provides an interface for using the web service on an external server device. The information processing apparatus 10 may provide the interface for using the web service as an API (Application Program Interface), or may provide the same as a part of the application, such as a web browser.

The information processing apparatus 10 has an application execution unit 12, a document storage unit 14, and a web service interface 20. The application execution unit 12 executes the application using the web service. The application execution unit 12 accesses the web service interface 20 to use the web service on the server device 100. The document storage unit 14 may store a document used by the application execution unit 12. The document storage unit 14 stores a tree-structured document such as the XHTML (eXtensible Hypertext Markup Language).

The web service interface 20 is an example of an interface in accordance with one embodiment of the invention, and when being accessed by the application execution unit 12 to use the web service on the external server device 100, the web service interface 20 sends a request message to the server device 100 and receives a response message including a result of the web service execution from the server device 100 via a network such as the Internet.

The web service interface 20 includes a tree structure storage unit 22, a request generation unit 24, a request sending unit 26, a response receiving unit 28, a response reflection unit 30, a cache processing unit 32, a conversion rule storage unit 34, and a conversion unit 36. The tree structure storage unit 22 stores a tree structure used for using the web service. The tree structure storage unit 22 may store, for example, the tree structure as an XML document. The tree structure stored in tree structure storage unit 22 includes a partial tree for request 40, which is accessed for sending a request for the web service, and a partial tree for response 50 which reflects the result of the web service. The partial tree for request 40 includes a request node 42 for calling the web service. The partial tree for response 50 includes a response node 52 for storing the result of the web service. Here, the partial tree for request 40 and the partial tree for response 50 may render either different nodes or an identical node to be a parent. In addition, the request node 42 and the response node 52 may be the same node. Moreover, the tree structure storage unit 22 may cache the response node 52 in which the result of the web service is reflected. Furthermore, the tree structure storage unit 22 may not store the request node 42 if the request generation unit 24 generates the request message.

The request generation unit 24 generates the request message for calling the web service according to the request node 42 in response to having accessed the request node 42 in the tree structure. In this embodiment, the request generation unit 24 generates the request message in response to being accessed by the application execution unit 12. The request sending unit 26 sends the request message generated by the request generation unit 24 to the server device 100 providing the web service as a target of the request message. The response receiving unit 28 receives the response message, including the result of having executed the web service, from the server device 100. The response reflection unit 30 reflects the result of having executed the web service included in the response message received by the response receiving unit 28 in the response node 52 in the tree structure.

The cache processing unit 32 controls caching of the response node 52 by the tree structure storage unit 22. The cache processing unit 32 may include a cache hit processing unit 62 and a cache miss processing unit 64. When accessed to execute the request for the web service, the cache hit processing unit 62 returns the result of the web service cached in the tree structure storage unit 22 to an access source, if the request node 42 has already been registered in the tree structure. When accessed to execute the request for the web service, the cache miss processing unit 64 causes the request sending unit 26 to send the request message to cache the result of the web service in the tree structure storage unit 22, and to register the request node 42 anew as a node in the tree structure, if the request node 42 has not been registered in the tree structure.

The conversion rule storage unit 34 stores a conversion rule for converting the response message received in response to accessing the request node 42, for each request node 42. The conversion unit 36 converts the tree structure reflecting the result of the web service included in the response message based on the conversion rule for the response message stored in the conversion rule storage unit 34.

Figure 2:
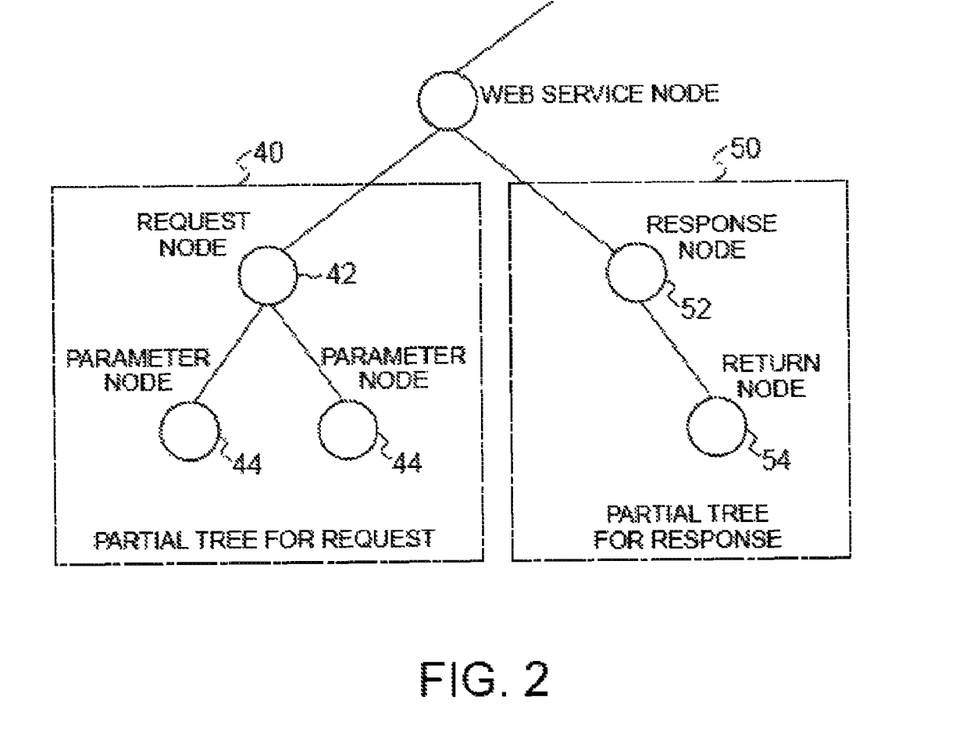
FIG. 2 shows a schematic example of configurations of a partial tree for request and a partial tree for response in accordance with one embodiment of the invention.

FIG. 2 shows an example of a partial tree for request 40 and a partial tree for response 50. The partial tree for request 40 includes a request node 42 as a root node. In addition, the partial tree for request 40 may include one or more parameter nodes 44 descended from the request node 42. Each parameter node 44 stores a parameter provided for the web service. For example, each parameter node 44 can store an argument passed to the web service. The application execution unit 12 may set each parameter provided for the web service for each parameter node 44 descended from the request node 42 defined in response to the web service. In this case, the request generation unit 24, as an example, may acquire the parameter from each parameter node 44 for which the parameter has been set by the application execution unit 12 to generate the request message including the parameter. Since it is possible to describe the argument included in the request message in the XML format in the SOAP, the request generation unit 24 may directly include the parameter node 44 expressed in the tree structure as an argument in the request message.

The partial tree for response 50 includes a response node 52 as the root node. In addition, the partial tree for response 50 may include one or more return nodes 54 descended from the response node 52. The return node 54 stores the result of having executed the web service included in the response message. The return node 54 stores a return value included in the response message. The response reflection unit 30 may reflect the result of the web service execution included in the response message in each return node 54 descended from the response node 52 defined in response to the web service. Since it is possible to describe the return value included in the response message in an XML format in SOAP, the response reflection unit 30 may directly replace the return value included in the response message for the return node 54.

In addition, since the result of the web service execution corresponding to the request message can be determined uniquely, the tree structure storage unit 22, may store the partial tree for request 40 and the partial tree for response 50, for example, for each web service or for each parameter sent to the web service, for the purpose of caching the result of the web service execution. In this case, when accessed by the application execution unit 12, the tree structure storage unit 22 stores the partial tree for request 40 and the partial tree for response 50, if the corresponding partial tree for request 40 has not been registered in the tree structure. Moreover, when accessed by the application execution unit 12, the tree structure storage unit 22 returns the partial tree for request 40 and the partial tree for response 50 which have been cached, if the corresponding partial tree for request 40 has been registered in the tree structure. This enables replying at high speed to the access by the application execution unit 12 in accordance with the tree structure storage unit 22.

Figure 3:
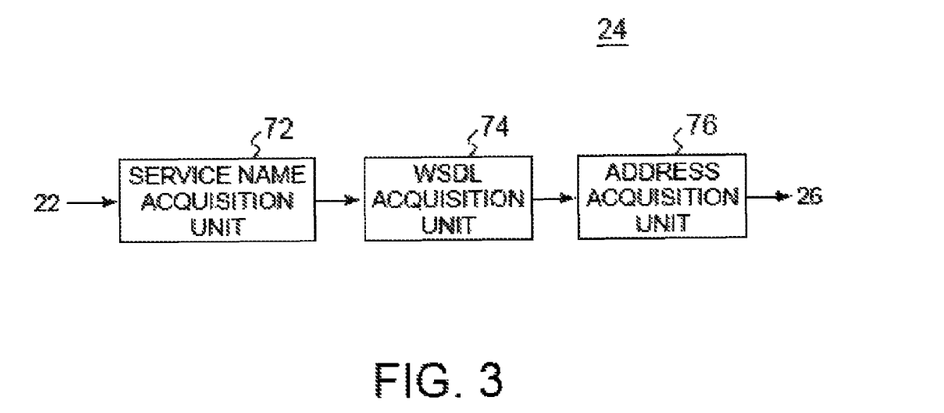
FIG. 3 shows an example of a configuration of a request generation unit in accordance with one embodiment of the invention.

FIG. 3 shows a schematic block diagram of a request generation unit 24. The request generation unit 24 may include a service name acquisition unit 72, a WSDL acquisition unit 74, and an address acquisition unit 76. The service name acquisition unit 72 acquires a name of the web service from the request node 42. The WSDL acquisition unit 74 acquires a WSDL (web Services Description Language) description defining a specification of the web service using the name of the web service acquired by the service name acquisition unit 72. The WSDL acquisition unit 74 may acquire the WSDL description by searching a registry, for example, using the UDDI (Universal Description Discovery, and Integration).

The address acquisition unit 76 acquires an address of the server device 100 providing the web service from the WSDL description acquired by the WSDL acquisition unit 74. The request sending unit 26 then sends the request message to the address acquired by the address acquisition unit 76. This makes it possible for the web service interface 20 to acquire a destination of the request message, namely, a location of the corresponding web service, and to send the request message to the server device 100 providing the corresponding web service.

Figure 4:
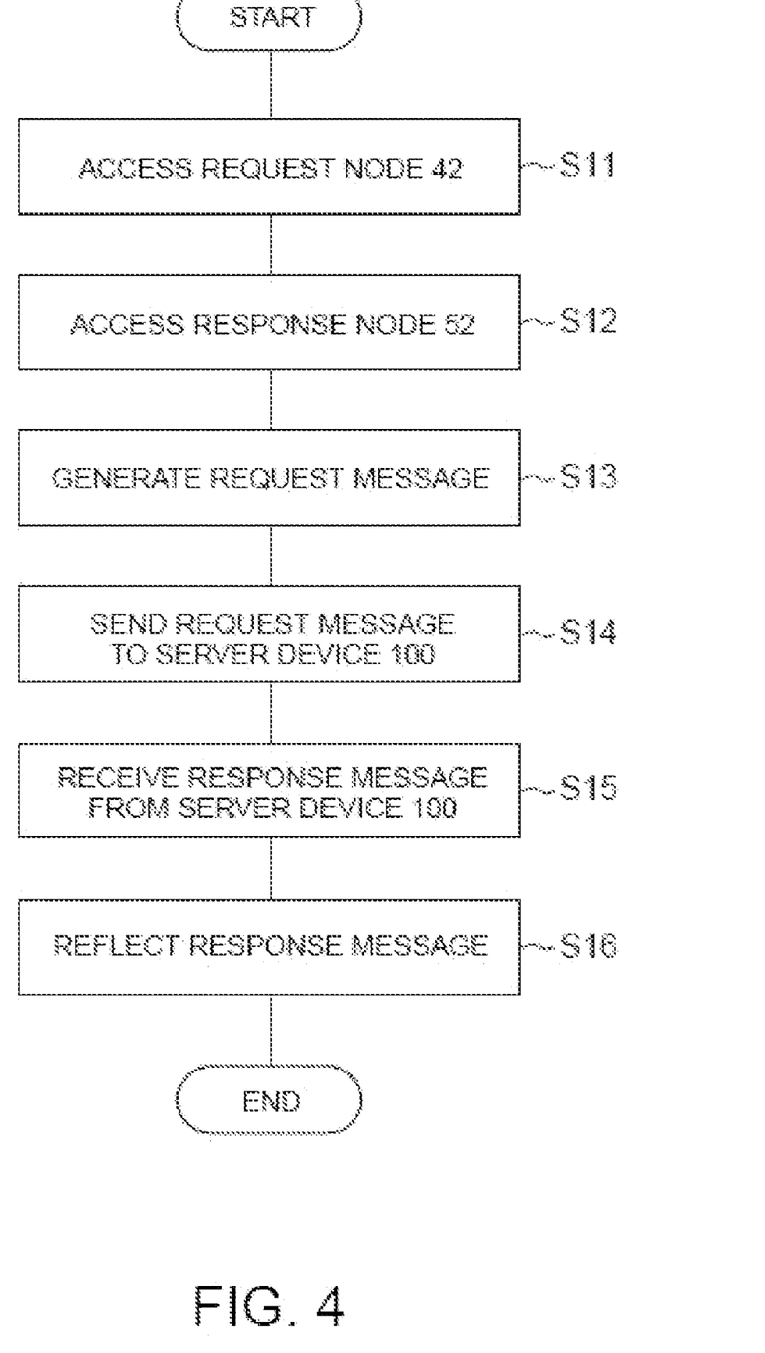
FIG. 4 is a flowchart illustrating processing of the information processing apparatus in accordance with one embodiment of the invention.

FIG. 4 shows a flowchart of the information processing apparatus 10 in accordance with one embodiment of the invention. When using the web service, the application execution unit 12 first accesses the request node 42 of the partial tree for request 40 in the tree structure stored in the tree structure storage unit 22 (step S11). In this case, the application execution unit 12 may access the request node 42 defined according to the web service to be used by specifying a path indicating a position of the request node 42 in the tree structure. When the accessed request node 42 has not been registered in the tree structure, the tree structure storage unit 22 registers the partial tree for request 40 and the partial tree for response 50 in the path specified in the tree structure.

The application execution unit 12 then accesses the response node 52 of the partial tree for response 50 in the tree structure stored in the tree structure storage unit 22 (step S12). In this case, the application execution unit 12 may access the response node 52 determined according to the web service to be used by specifying the path for following the tree structure.

When the accessed response node 52 has already been registered in the tree structure, the tree structure storage unit 22 may return to the application execution unit 12 the result of the web service execution to be stored in the response node 52 or the node descended from the response node 52, and end the processing.

If the accessed request node 42 has not been registered in the tree structure, the request generation unit 24 generates the request message for calling up the web service corresponding to the request node 42 (step S13). The request sending unit 26 then sends the request message to the server device 100 providing the web service (step S14). The request message having been sent is provided to the server device 100. The server device 100 which received the request message executes the web service. The server device 100 then returns the response message including the result of the web service execution.

The response receiving unit 28 then receives the response message from the server device 100 (step S15). The response reflection unit 30 then reflects the result of the web service execution included in the response message in the response node 52 in the tree structure (step S16). The tree structure storage unit 22 then returns the result of the web service execution to be stored in the response node 52 or the node descended from the response node 52, to the application execution unit 12, which ends the process.

According to the web service interface 20 described above, the result of having executed the web service is returned by the application execution unit 12 accessing the node in the tree structure. That is, by using the web service interface 20, it is possible to enable the application execution unit 12 to use the web service on the external server device by performing the same processing as the processing executed when accessing the document layered by the tree structure. Hence, by using the web service interface 20, even when using both the document layered by the tree structure and the web service, it is possible to unify a program to be executed by the application execution unit 12 into a program using a program model for accessing data layered by the tree structure. This makes it possible to use the web service interface 20 to reduce the programming burden for the user.

In addition, when the document storage unit 14 stores a document to be used by the application in a second tree structure different from the tree structure that is stored in the tree structure storage unit 22, the application execution unit 12 may duplicate the partial tree for response 50 in the tree structure including the at least one response node 52 in which the result of one web service has been reflected, as a partial tree in the second tree structure stored in the document storage unit 14. This makes it possible for the application execution unit 12, to handle the result of having executed the web service acquired by the web service interface 20 as a part of the document created by the application execution unit 12.

Moreover, the tree structure storage unit 22 may store the document to be used by the application in the tree structure used for using the web service. In this case, the application execution unit 12 accesses the tree structure stored in the tree structure storage unit 22 to use the document. Furthermore, when reflecting the result of using the web service in a part of the document, the application execution unit 12 accesses the request node 42 defined in response to the part of the document in the tree structure stored in the tree structure storage unit 22. The response reflection unit 30 then reflects the result of having executed the web service in the part of the document. This makes it possible for the application execution unit 12 to handle the result of the web service execution acquired by the web service interface 20 as the part of the document created by the application execution unit 12.

Further, the web service interface 20 can send the request message and register the response node 52 in any of a synchronous mode, an asynchronous mode, or a lazy mode.

In case of a synchronous mode, the tree structure storage unit 22 registers the request node 42 in response to the request node 42 having been accessed. When registering the request node 42, the web service interface 20 blocks the application having accessed to the request node 42 until the result of the web service execution is reflected in the response node 52. The request generation unit 24 generates the request message in response to the request node 42 having been accessed. The request sending unit 26 sends the request message to the server device 100. The response reflection unit 30 registers the response node 52 in response to the response message having been received by the response receiving unit 28 and reflects the result of the web service execution in the registered response node 52. The tree structure storage unit 22 then returns the result of the web service execution in response to the response node 52 having been accessed, and opens the application having been blocked. By the web service interface 20 operating in such a synchronous mode, the application execution unit 12 can execute the program created without being conscious of a processing time in the web service.

In case of an asynchronous mode, the tree structure storage unit 22 registers the request node 42 in response to the request node 42 having been accessed. When registering the request node 42, the web service interface 20 opens the application having accessed to the request node 42. This enables the application to execute other processing. The request generation unit 24 generates the request message in response to accessing the request node 42. The request sending unit 26 sends the request message to the server device 100. The response reflection unit 30 reflects the result of the web service execution in the response node 52 in response to receiving the response message by the response receiving unit 28. The tree structure storage unit 22 then stands by for the access to the response node 52 by the application, and returns the result of the web service execution to the access source in response to accessing the response node 52. By the web service interface 20 operating in such an asynchronous mode, the application execution unit 12 can execute other processing in parallel during a period between the access to the request node 42 and the access to the response node 52.

In case of a lazy mode, the tree structure storage unit 22 registers the request node 42 and the response node 52 in response to accessing the request node 42. The request generation part 24 does not generate the request message at the time when the request node 42 is accessed, but subsequently generates the request message in response to accessing the response node 52 after accessing the request node 42. The request sending unit 26 sends the request message to the server device 100. The response reflection unit 30 reflects the result of the web service execution in the response node 52 in response to receiving the response message by the response receiving unit 28. The tree structure storage unit 22 then returns the result of the web service execution to the access source. By the web service interface 20 operating in such a lazy mode, the application execution unit 12 does not need access after detecting that the result of the web service execution has been prepared. Operating the web service interface 20 in the lazy mode makes it possible to call up the web service for which an execution result is likely to be used. Thus, the web service interface 20 can prevent unnecessary calls to the web service.

Figure 5:
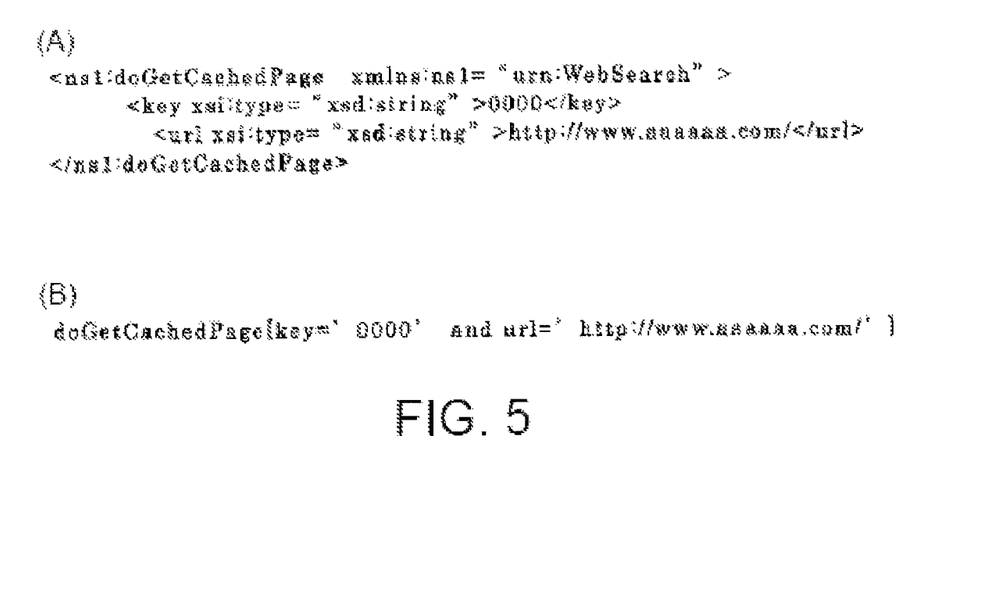
FIG. 5(A) shows an example of a body part of a SOAP request message when using a web service providing a web page cached in a server device in accordance with one embodiment of the invention.
FIG. 5(B) shows an XPath formula for sending a request by specifying the partial tree for request as the basis of (A) in accordance with one embodiment of the invention.

FIG. 5(A) shows an example of a body part of the request message of the SOAP when using the web service providing the web page which the server device 100 caches inside, while FIG. 5(B) shows an XPath formula for sending the request by specifying the partial tree for request 40 as the basis of (A). When receiving the request message in which a search key and an URL (Uniform Resource Locator) as a target of search are described in an XML format, the web service in this example searches the cached web page of the relevant URL and returns the hit web page.

The request message of FIG. 5(A) includes a key element and a URL element in an element (for example, dogetCachedPage) for specifying the web service of this example. The key element specifies the search key (for example, 0000). The URL element specifies the URL (for example, http://www.aaaaaa.com) as the target of search. In order to cause the request generation part 24 to create such a request message, the tree structure storage unit 22 may store a sub-tree including a dogetCachedPage node indicating the web service of this example as the root node of the partial tree for request 40 and the search key and the URL as the target of search as child nodes. The request generation part 24 can extract "xsi:type=" from the WSDL description.

Here, the tree structure storage unit 22 may add a new sub-tree to the stored tree structure in response to the tree structure being accessed by the application execution unit 12 using XPath. This enables the application execution unit 12 to create the sub-tree intended for creating the SOAP request message illustrated in FIG. 5(A) by accessing the tree structure using the XPath formula illustrated in FIG. 5(B).

The tree structure storage unit 22 may execute the following processing to add the new sub-tree to the tree structure in response to being accessed using the XPath. When being accessed by the XPath, the tree structure storage unit 22 first determines whether or not the node selected by the XPath has been registered. When the node has been registered, the tree structure storage unit 22 returns the node, and ends the processing. When the node has not been registered, the tree structure storage unit 22 breaks down the XPath formula into location steps and determines whether or not there is a node for every location step. When the location step in which there is not any node is detected, the tree structure storage unit 22 adds the corresponding node to the tree structure. This enables the tree structure storage unit 22 to add the sub-tree to the tree structure according to the access by the XPath.

It should be noted that when creating the sub-tree in the tree structure of the XML document, the application execution unit 12 preferably creates the XPath formula expressed in accordance with the following first and second conditions. As the first condition, the application execution unit 12 creates the XPath formula in which all of test nodes are specified by specific element names. For example, the application execution unit 12 creates the XPath formula using an expression in which all specific elements, such as asterisks and "//", are specified. Moreover, as the second condition, the application execution unit 12 creates an XPath formula in which a predicate is subject to the following format. [PathExpr=Literal ... and PathExpr=Literal]. Here, PathExpr and Literal are defined in accordance with an XPath specification (J. Clark and S. DeRose, XML Path Language (XPath) Version 1.0, W3C Recommendation 16 Nov. 1999, http://www.w3.org/TR/1999/REC-xpath-19991116). By being accessed with the XPath formula expressed in accordance with these first and second conditions, the tree structure storage unit 22 can uniquely specify the node in the tree structure.

The tree structure storage unit 22 can also preliminarily verify the validity of the tree structure after having added the sub-tree, using a WSDL file. When the tree structure is not valid after having added the sub-tree, the tree structure storage unit 22 does not need to add the sub-tree.

As described above with reference to the application execution unit 12, since it is possible to access the tree structure stored in the tree structure storage unit 22 by the XPath, this the web service can be used on the external server device 100 with the same processing as the processing executed in the XML document.

Figure 6:
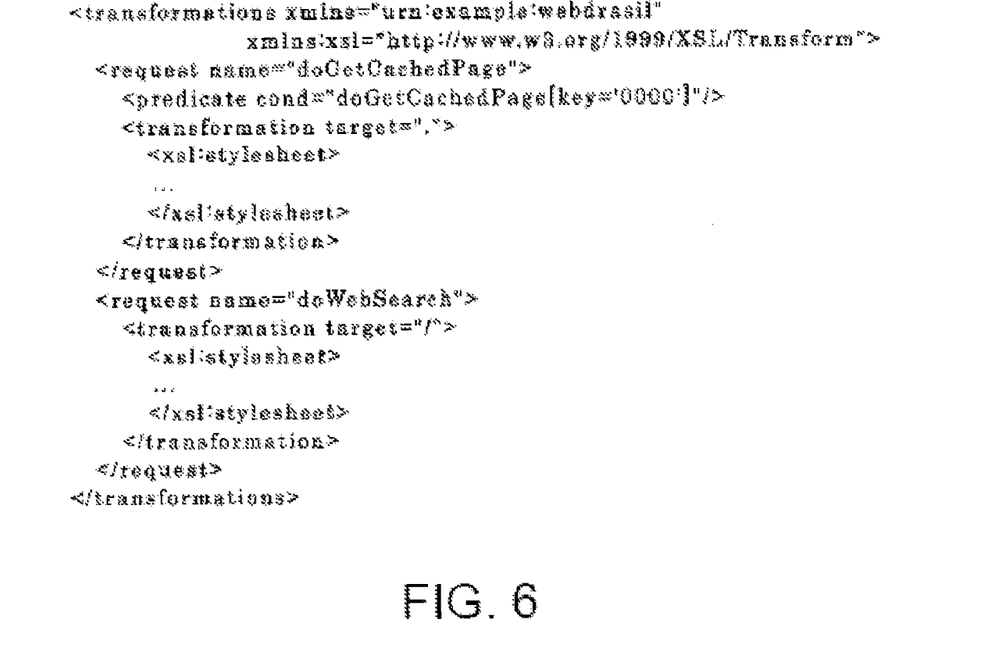
FIG. 6 shows an example of a conversion condition by a conversion unit in accordance with one embodiment of the invention.

FIG. 6 shows an exemplary description of a conversion condition by the conversion unit 36. The conversion unit 36 converts the tree structure of the partial tree for response 50, in which the result of the web service stored in the tree structure storage unit 22 is reflected, based on the conversion rule stored in the conversion rule storage unit 34. The conversion unit 36 can convert, for example, a tree structure in accordance with the conversion rule described in the XML conversion language as illustrated in FIG. 6.

In FIG. 6, a request element indicates that a partial tree for response 50 corresponding to either request message is to be converted. A predicate element indicates the parameter included in the request message. A Transformation element indicates a conversion method. A target attribute in the Transformation element specifies a position of the node to be a conversion target in the tree structure, for example. More specifically, the target attribute specifies the partial tree for response 50 as the conversion target when the attribute is described as target=".", or specifies the whole tree structure as the conversion target when the attribute is described as target="/". A style sheet element indicates specific contents of the conversion.

By being provided with the conversion unit 36 as described above, according to the web service interface 20, it is possible to convert the result of the web service execution into a structure suitable for the application using the web service. In addition, by being provided with the conversion unit 36, according to the web service interface 20, it is not necessary to change the description of the program of each application even when the specification of the result of execution the web service is modified, and therefore, it is possible to reduce the burden on the user.

Figure 7:
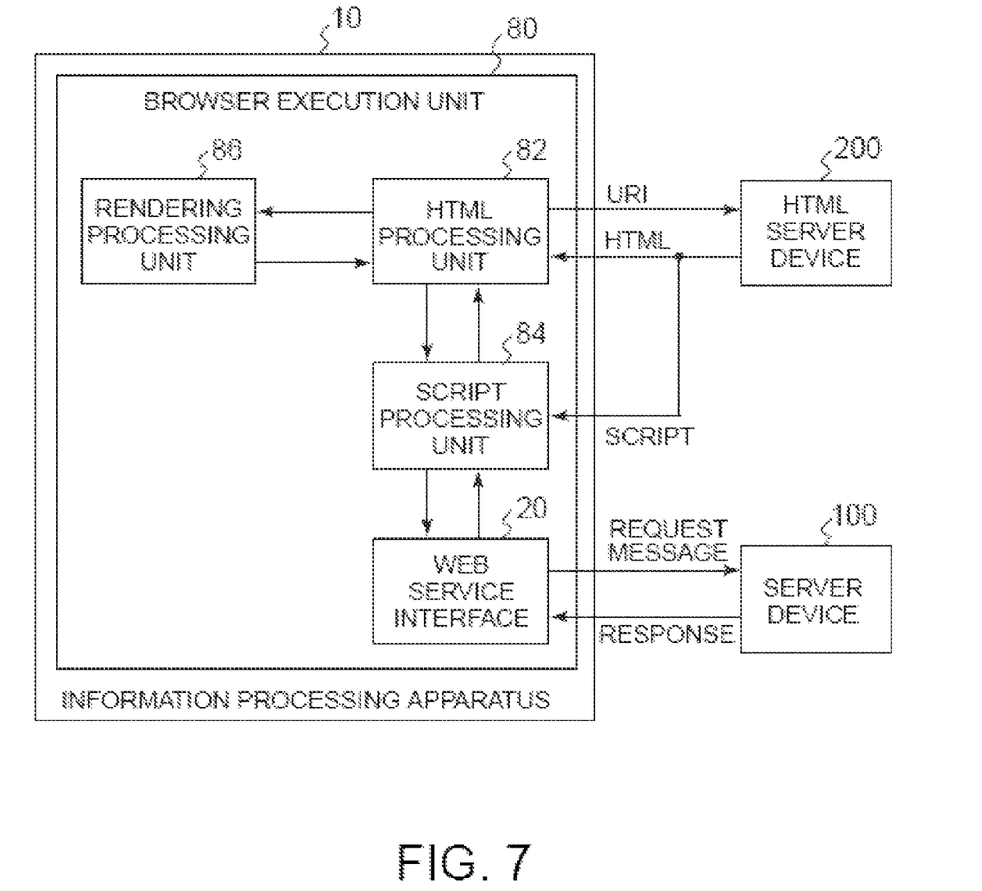
FIG. 7 is a schematic view of the information processing apparatus along with the server device and an HTML server device in accordance with one embodiment of the invention.

FIG. 7 shows a configuration of the information processing apparatus 10 according to another embodiment, along with the server device 100 and an HTML server device 200. Since each component illustrated in FIG. 7 adopts the substantially same configuration and function as the component with the same reference numeral illustrated in FIG. 1, the description thereof will be omitted below, except for differences. The HTML server device 200 provides the information processing apparatus 10 with the HTML (Hypertext Markup Language) document.

The information processing apparatus 10 in this example is has a browser execution unit 80. The browser execution unit 80 executes a browser for browsing the HTML document in addition to using the web service. The browser execution unit 80 has an HTML processing unit 82, a script processing unit 84, a rendering processing unit 86, and the web service interface 20. The HTML processing unit 82 acquires and analyzes the HTML document. The script processing unit 84 executes a script included in the HTML document. The rendering processing unit 86 renders the HTML document analyzed by the HTML processing unit 82. The application execution unit 12 illustrated in FIG. 1A is an example of a functional block combining the HTML processing unit 82, the script processing unit 84, and the rendering processing unit 86.

Figure 8:
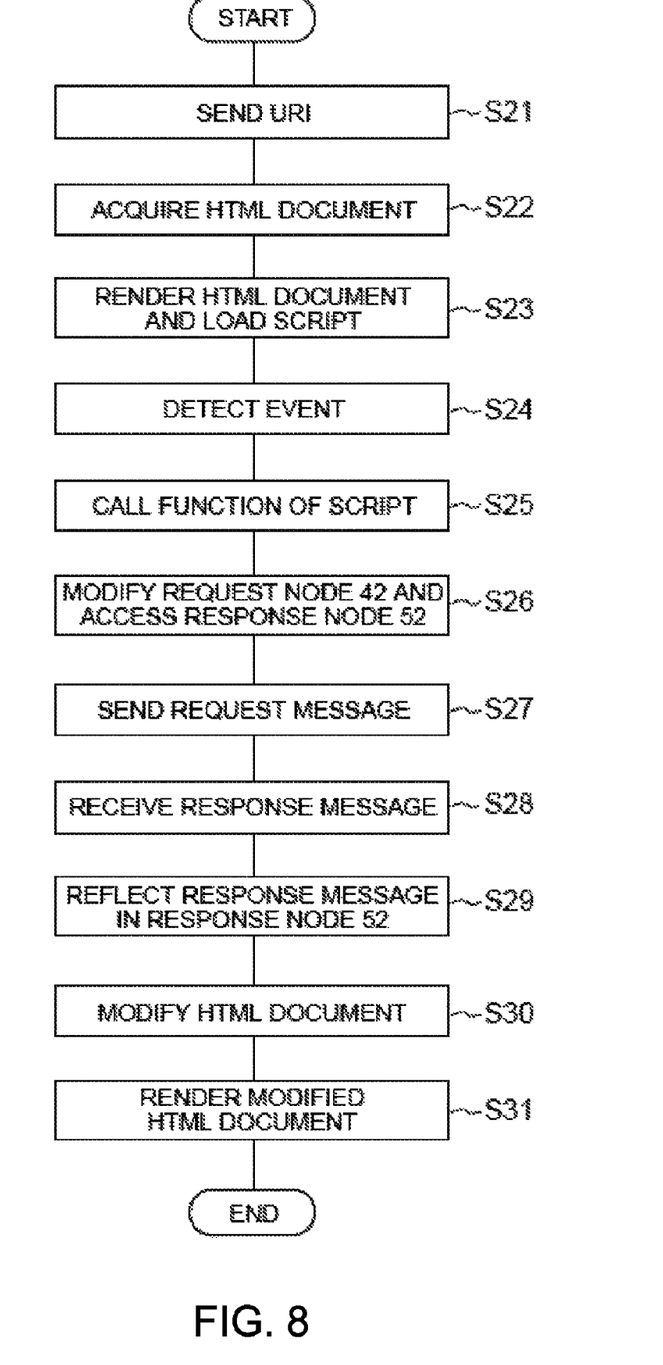
FIG. 8 is a flowchart for processing of the web service by the information processing apparatus of FIG. 7 in accordance with one embodiment of the invention.

FIG. 8 is a flowchart showing an example of the processing of the web service by the information processing apparatus 10 illustrated in FIG. 7. First, the HTML processing unit 82 sends a URI (Uniform Resource Identifier) to the HTML server device 200 (step S21). The HTML processing unit 82 then acquires and analyzes the corresponding HTML document (step S22). The rendering processing unit 86 then renders the HTML document acquired by the HTML processing unit 82. Therewith, the script processing unit 84 loads the script included in the HTML document (step S23). The HTML processing unit 82 then detects that an event accompanying execution of the loaded script is generated (step S24). The HTML processing unit 82, may detect, for example, that the event is generated in response to a keyword input into a search key word box in the HTML document.

The HTML processing unit 82 then calls up the corresponding script loaded by the script processing unit 84 (step S25). The script processing unit 84 then, while executing the script using the web service, calls up the web service interface 20, and accesses the request node 42 and the response node 52, for example, by specifying the XPath (step S26).

The web service interface 20 then, in response to having received the access to the request node 42, generates the request message for calling up the web service complying with the request node 42 and sends the message to the server device 100 (step S27). The web service interface 20 then receives the response message from the server device 100 (step S28). The web service interface 20 then reflects the result of the web service execution included in the response message, in the response node 52 (step S29).

The script processing unit 84 then modifies a corresponding part of the HTML document held by the HTML processing unit 82 based on the response node 52 in which the result of the web service execution is reflected (step S30). The tree structure storage unit 22 may duplicate, for example, the partial tree for response 50 including the response node 52 in which the result of the web service execution is reflected to the HTML document held by the HTML processing unit 82. The rendering processing unit 86 then renders the modified HTML document (step S31).

With such a browser execution unit 80, since it is possible to use the web service interface 20 within the script, access to the web service from the script is facilitated. By executing the script, the browser execution unit 80 can incorporate the result of the web service execution into the HTML document. More specifically, for example, the browser execution unit 80 may display the result of the web service execution reflected in the response node 52 of the tree structure in the web service interface 20 when having detected the operation to a certain object included in the HTML document, or may display the object in the original HTML document when not having detected the operation to the object.

Figure 9A:
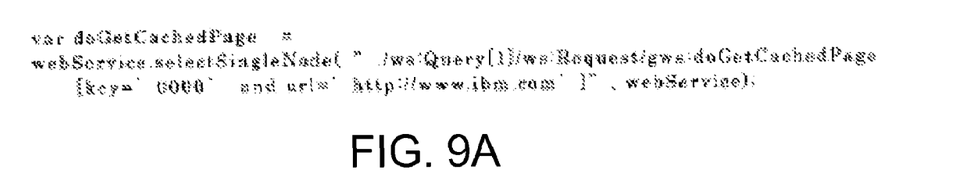
FIG. 9(A) shows an XPath formula for accessing "ws: Request" in a tree structure for using the web service providing the cached web page in accordance with one embodiment of the invention.
Figure 9B:
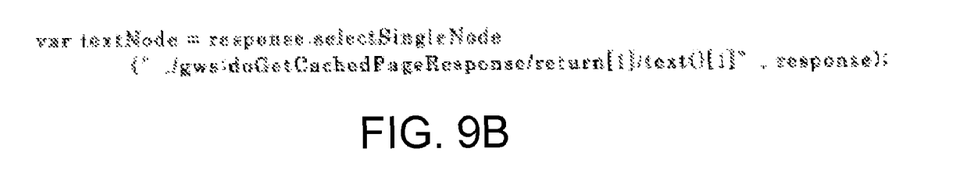
FIG. 9(B) shows an XPath formula for accessing "ws: Response" in the tree structure in accordance with one embodiment of the invention.
Figure 10:
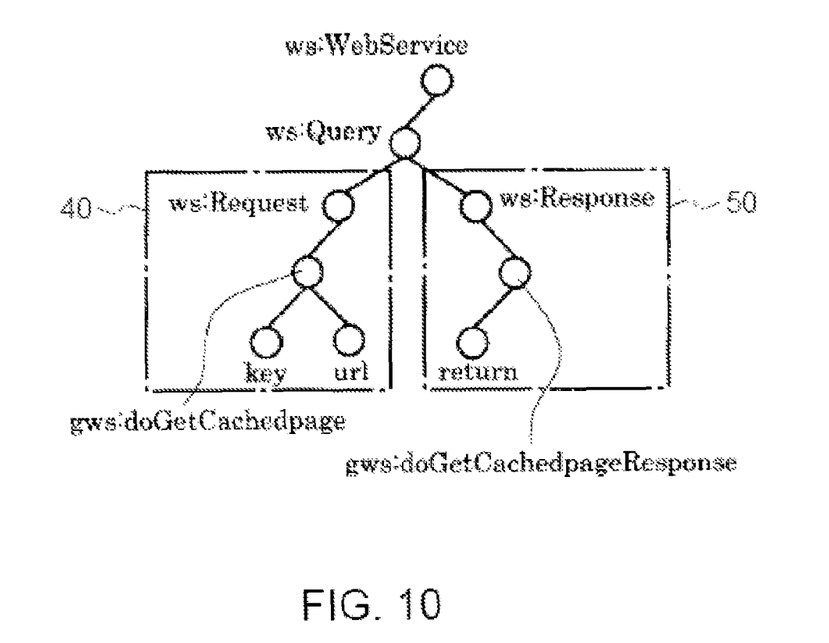
FIG. 10 shows an example of the tree structure generated by the XPath formula illustrated in FIGS. 9(A) and 9(B) in accordance with one embodiment of the invention.

FIG. 9(A) illustrates an example of the script for accessing "ws:Request" for acquiring the web service providing the cached web page, while FIG. 9(B) illustrates an example of a code of the script for accessing "ws:Response". FIG. 10 illustrates an example of the tree structure generated by the XPath formula illustrated in FIGS. 9(A) and 9(B).

When using the web service providing the cached web page, the script processing unit 84 may access the web service interface 20 by the XPath formula illustrated in FIG. 9(A). This enables the script processing unit 84 to create a new partial tree for request 40 and a partial tree for response 50 under "ws:Query", as illustrated in FIG. 10. The script processing unit 84 can access the request node 42 with a relatively short code by using the XPath.

The tree structure illustrated in FIG. 10 has four nodes, "ws:webService", "ws:Query", "ws:Request", and "ws:Response". "ws:webService" is a root node of the tree structure, and may have the URL of the WSDL file used for determining whether or not the tree structure after having added the subtree is valid. "ws:Query" is a child of "ws:webService", and expresses a query corresponding to each of web services. "ws:Query" contains the partial tree for request 40 including "ws:Request" and the partial tree for response 50 including "ws:Response" as the children.

"ws:Request" is an example of the request node 42. "ws:Request" has a parameter node 44 with the same configuration as that of the body part of the request message by the SOAP. In this example, "ws:Request" has "gws:doGetCachePage" as the child, as well as "gws:key" and "gws:url" as grandchildren. "gws:doGetCachePage" indicates contents of the web service. "gws:key" indicates the search key, and "gws:url" indicates the target of search.

"ws:Response" is an example of a response node 52. "ws:Response" has a return node 54 with the same configuration as that of the body part of the response message by the SOAP. Here, "ws:Response" has "gws:doGetCachePageResponse" as the child of return node 54 and "gws:return" indicating a search result as the grandchild of the return node 54.

The script processing unit 84 may also access the web service interface 20 by the XPath formula illustrated in FIG. 9(B). This enables the script processing unit 84 to acquire the result of the web service execution providing the cached web page from the partial tree for response 50 under "ws:Response" as illustrated in FIG. 10. By using the XPath, the script processing unit 84 can acquire the result of the web service execution from the response node 52 with the relatively short code.

Figure 11:
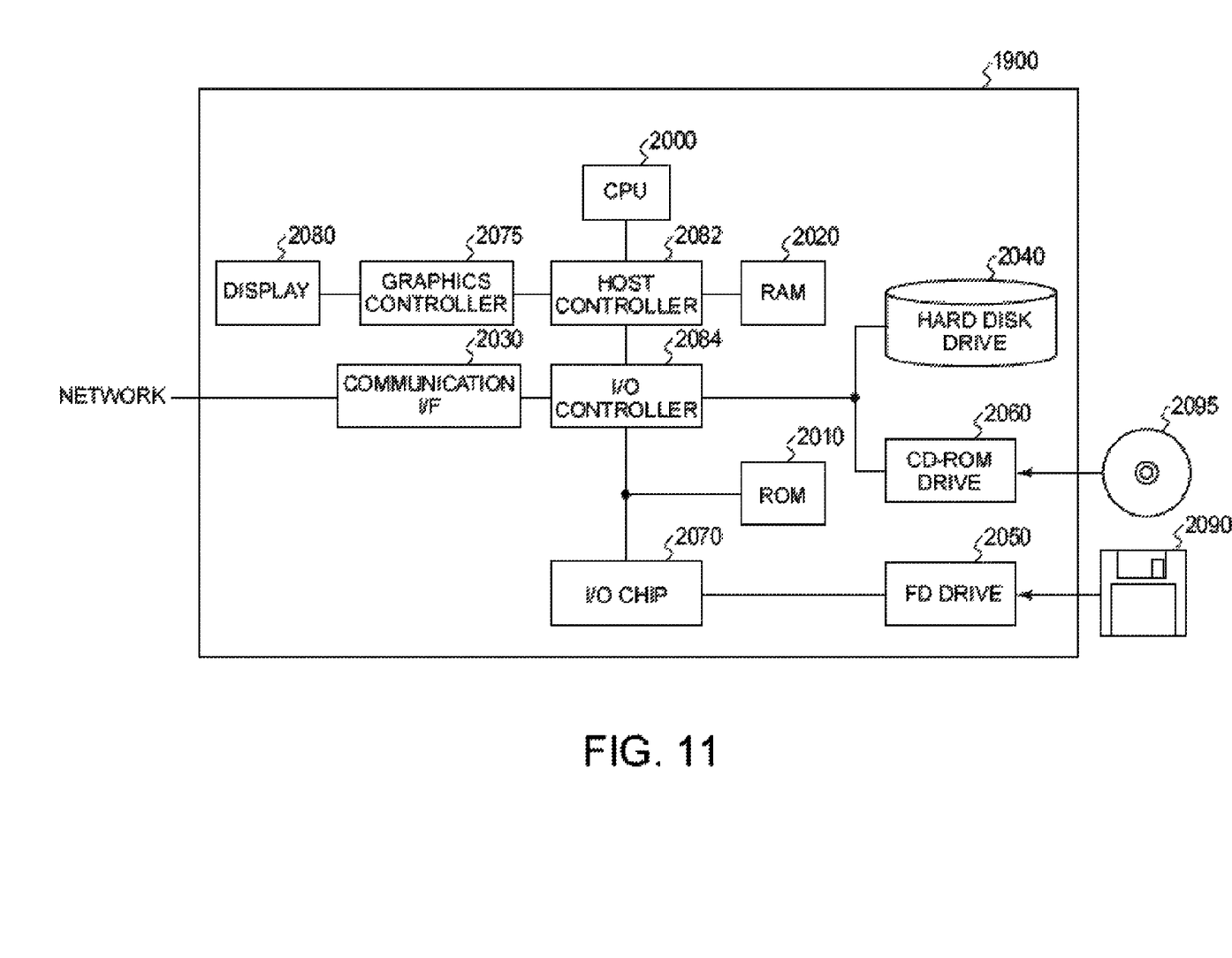
FIG. 11 shows an example of a hardware configuration of a computer in accordance with one embodiment of the invention.

FIG. 11 is a schematic block diagram of a hardware configuration of a computer 1900 in accordance with one embodiment of the invention. The computer 1900 is provided with a CPU periphery unit having a CPU 2000, a RAM 2020, a graphics controller 2075, and a display 2080, which are interconnected by host controller 2082, an I/O unit having a communication interface 2030, a hard disk drive 2040, and a CD-ROM drive 2060, which are connected to the host controller 2082 via an I/O controller 2084, and a legacy I/O unit having a ROM 2010, a flexible disk drive 2050, and an I/O chip 2070, which are connected to the I/O controller 2084.

The host controller 2082 connects the RAM 2020 with the CPU 2000 and the graphics controller 2075 which access the RAM 2020 at a high transfer rate. The CPU 2000 operates based on the program stored in the ROM 2010 and the RAM 2020, and controls each unit. The graphics controller 2075 acquires image data generated on a frame buffer provided in the RAM 2020 by the CPU 2000 and the like, and displays the same on the display 2080. Alternatively, the graphics controller 2075 may include a frame buffer for storing the image data generated by the CPU 2000 and the like.

The I/O controller 2084 connects the host controller 2082 to the communication interface 2030, the hard disk drive 2040, and the CD-ROM drive 2060, which are relatively high-speed I/O devices. The communication interface 2030 communicates with other devices via the network. The hard disk drive 2040 stores the program and the data used by the CPU 2000 in the computer 1900. The CD-ROM drive 2060 reads the program or the data from the CD-ROM 2095, and provides the same to the hard disk drive 2040 via the RAM 2020.

The I/O controller 2084 is also connected to the ROM 2010, the flexible disk drive 2050, and the I/O chip 2070, which are relatively low-speed I/O devices. The ROM 2010 stores a boot program executed by the computer 1900 when starting up, the program depending on hardware of the computer 1900, or the like. The flexible disk drive 2050 reads the program or the data from a flexible disk 2090, and provides the same to the hard disk drive 2040 via the RAM 2020. The I/O chip 2070 connects the flexible disk drive 2050, as well as various I/O devices via a parallel port, a serial port, a keyboard port, a mouse port, or the like.

The program provided to the hard disk drive 2040 via the RAM 2020 is stored in a recording medium, such as a flexible disk 2090, a CD-ROM 2095, or an IC card, and is provided by the user. The program is read from the recording medium, installed in the hard disk drive 2040 in the computer 1900 via the RAM 2020, and executed in the CPU 2000.

The program which is installed in the computer 1900 and causes the computer 1900 to function as the web service interface 20 is provided with a tree structure storage unit module, a request generation unit module, a request sending unit module, a response receiving unit module, a response reflection unit module, a cache processing unit module, a conversion rule storage unit module, and a conversion unit module. These programs or modules work on the CPU 2000 or the like to cause the computer 1900 to function as the tree structure storage unit 22, the request generation unit 24, the request sending unit 26, the response receiving unit 28, the response reflection unit 30, the cache processing unit 32, and the conversion rule storage unit 34, respectively.

The programs or modules mentioned above may be stored in an external storage medium. In addition to the flexible disk 2090 and the CD-ROM 2095, as the storage medium, it is possible to use an optical recording medium such as a DVD or a CD, an optical magnetic recording medium such as an MO, a tape medium, and a semiconductor memory such as an IC card. In addition, storage device such as a hard disk or a RAM, provided in a server system connected to a dedicated communication network or the Internet may be used as the recording medium to provide the program to the computer 1900 via the network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the invention has been described using the above exemplary embodiments, the technical scope of the invention is not limited to the scope of the above-described embodiments. It is clear to a person skilled in the art that various modifications or improvement may be made to the above-described embodiments. It is clear from the description of the claims that such modified or improved embodiments are also included within the scope of the invention.

The invention claimed is:

1. A client-side information processing apparatus operable to provide an interface for using a web service on an external server device, comprising:
   a processor;
   a first storage unit operable to store a first tree structure for accessing the web service, wherein the first tree structure includes:
      a partial tree for request having a request node and one or more parameter nodes descended from the request node, wherein each parameter node is operable to store a parameter to be provided to the web service when executing a request to the web service, and
      a partial tree for response having a response node and one or more return nodes descended from the response node, wherein each response node is operable to store a result of having executed the request at the web service;
   an application execution unit operable to execute an application using the web service and to store each parameter to be provided to the web service into each parameter node descended from the request node for the web service;
   a request generation unit operable to:
      acquire the parameters from each parameter node in which a parameter has been stored by the application execution unit, and
      generate a request message including the parameters for calling up the web service,
   wherein the request generation unit further includes:
      a service name acquisition unit operable to acquire a name of the web service from the request node;
      a Web Services Description Language acquisition unit operable to acquire a Web Services Description Language description defining a specification of the web service using the name of the web service; and
      an address acquisition unit operable to acquire an address of the server device which provides the web service from the Web Services Description Language description;
   a request sending unit operable to send the request message to the server device providing the web service, as defined by the address acquired by the address acquisition unit;
   a response receiving unit operable to receive a response message, including a result of having executed the web service, from the server device; and
   a response reflection unit operable to store the response from the web service in the response node and the one or more return nodes in the partial tree for response.

2. The information processing apparatus of claim 1, further comprising:
a second storage unit operable to store a document used by the application in a second tree structure,
wherein the application execution unit is operable to replicate the partial tree for response in the first tree structure including the at least one response node in which the result of the web service is stored as a partial tree into the second tree structure.

3. The information processing apparatus of claim 1, wherein
the storage unit is operable to store a document used by the application with the first tree structure,
the application execution unit, as a result of having used the web service for part of the document, is operable to access the request node in the first tree structure, the first tree structure being defined corresponding to the part of the document, and
the response reflection unit is operable to store the result of having executed the web service in the part of the document.

4. The information processing apparatus of claim 1, wherein the request generation unit is operable to generate a request message in response to having accessed the request node with a path indicating a position in the first tree structure.

5. The information processing apparatus of claim 1, wherein:
the first storage unit is operable to cache the response node in which the result of the web service is stored, the first storage unit further comprising:
a cache hit processing unit operable to return the result of the web service cached on the first storage unit, if the request nodes have already been registered in the first tree structure; and
a cache miss processing unit operable to cause the request sending unit to send the request message in order to cache the result of the web service on the first storage unit, and to register anew the request nodes as nodes in the first tree structure, when the request nodes have not been registered in the first tree structure.

6. The information processing apparatus of claim 1, wherein the request generation unit is operable to generate the request message in response to accessing the response node after accessing the request node.

7. The information processing apparatus of claim 1, further comprising:
a conversion rule storage unit operable to store a conversion rule to convert the response message received complying with having accessed the request node in response to the each request node; and
a conversion unit operable to convert the first tree structure in which the result of the web service included in the response message has been stored based on the conversion rule corresponding to the response message.

8. A computer-implemented method for providing an interface which uses a web service on an external server device by a client-side information processing apparatus, the method comprising the steps of:
storing a first tree structure for accessing the web service in a first storage unit in the information processing apparatus, wherein the first tree structure includes:
a partial tree for request having a request node and one or more parameter nodes descended from the request node, wherein each parameter node is operable to store a parameter to be provided to the web service when executing a request to the web service, and
a partial tree for response having a response node and one or more return nodes descended from the response node, wherein each response node is operable to store a result of having executed the request at the web service;
executing an application using the web service;
storing each parameter to be provided to the web service into each parameter node descended from the request node for the web service;
acquiring the parameters from each parameter node in which a parameter has been stored;
generating a request message including the parameters for calling up the web service;
acquiring a name of the web service from the request node;
acquiring a Web Services Description Language description defining a specification of the web service using the name of the web service;
acquiring an address of the server device which provides the web service from the Web Services Description Language Description;
sending the request message to the server device providing the web service, as defined by the acquired address;
receiving a response message which includes a result of having executed the web service from the server device; and
storing the response from the web service in the response node and the one or more return nodes in the partial tree for response.

9. The method of claim 8, further comprising:
storing a document used by the application in a second tree structure;
wherein executing includes replicating the partial tree for response in the first tree structure including the at least one response node in which the result of the one web service is stored as a partial tree into the second tree structure.

10. The method of claim 8, further comprising:
storing a document used by the application with the first tree structure,
accessing the request node in the first tree structure, the first tree structure being defined corresponding to the part of the document, and
storing the result of having executed the web service in the part of the document.

11. The method of claim 8, further comprising:
generating a request message in response to having accessed the request node with a path indicating a position in the first tree structure.

12. The method of claim 8, further comprising:
caching the response node in which the result of the web service is stored, wherein the caching includes:
returning the result of the web service cached on the first storage unit, if the request nodes have already been registered in the first tree structure; and
sending the request message in order to cache the result of the web service on the first storage unit, and registering anew the request nodes as nodes in the first tree structure, when the request nodes have not been registered in the first tree structure.

13. The method of claim 8, further comprising generating the request message in response to accessing the response node after accessing the request node.

14. The method of claim 8, further comprising:
  storing a conversion rule to convert the response message received complying with having accessed the request node in response to the each request node; and
  converting the first tree structure in which the result of the web service included in the response message has been stored based on the conversion rule corresponding to the response message.

15. A computer program product for providing an interface which uses a web service on an external server device by a client-side information processing apparatus, the computer program product comprising:
  a tangible non-transitory computer readable storage medium having computer readable program code embodied therewith, the computer readable program code comprising:
  computer readable program code configured to store a first tree structure for accessing the web service in a first storage unit in the information processing apparatus, wherein the first tree structure includes:
    a partial tree for request having a request node and one or more parameter nodes descended from the request node, wherein each parameter node is operable to store a parameter to be provided to the web service when executing a request to the web service, and
    a partial tree for response having a response node and one or more return nodes descended from the response node, wherein each response node is operable to store a result of having executed the request at the web service;
  computer readable program code configured to execute an application using the web service;
  computer readable program code configured to store each parameter to be provided to the web service into each parameter node descended from the request node for the web service;
  computer readable program code configured to acquire the parameters from each parameter node in which a parameter has been stored;
  computer readable program code configured to generate a request message including the parameters for calling up the web service;
  computer readable program code configured to acquire a name of the web service from the request node;
  computer readable program code configured to acquire a Web Services Description Language description defining a specification of the web service using the name of the web service;
  computer readable program code configured to acquire an address of the server device which provides the web service from the Web Services Description Language Description;
  computer readable program code configured to send the request message to the server device providing the web service, as defined by the acquired address;
  computer readable program code configured to receive a response message which includes a result of having executed the web service from the server device; and
  computer readable program code configured to store the response from the web service in the response node and the one or more return nodes in the partial tree for response.

16. The computer program product of claim 15, further including:
  computer readable program code configured to store a document used by the application in a second tree structure;
  wherein the computer readable program code configured to execute the application includes computer readable program code configured to replicate the partial tree for response in the first tree structure including the at least one response node in which the result of the one web service is stored as a partial tree into the second tree structure.

17. The computer program product of claim 15, further including:
  computer readable program code configured to store a document used by the application with the first tree structure,
  computer readable program code configured to access the request node in the first tree structure, the first tree structure being defined corresponding to the part of the document, and
  computer readable program code configured to store the result of having executed the web service in the part of the document.

18. The computer program product of claim 15, further including:
  computer readable program code configured to generate a request message in response to having accessed the request node with a path indicating a position in the first tree structure.

19. The computer program product of claim 15, further including:
  computer readable program code configured to cache the response node in which the result of the web service is stored, wherein the computer readable program code configured to cache includes:
    computer readable program code configured to return the result of the web service cached on the first storage unit, if the request nodes have already been registered in the first tree structure; and
    computer readable program code configured to send the request message in order to cache the result of the web service on the first storage unit, and register anew the request nodes as nodes in the first tree structure, when the request nodes have not been registered in the first tree structure.

20. The computer program product of claim 15, further including computer readable program code configured to generate the request message in response to accessing the response node after accessing the request node.

21. The computer program product of claim 15, further including:
  computer readable program code configured to store a conversion rule to convert the response message received complying with having accessed the request node in response to the each request node; and
  computer readable program code configured to convert the first tree structure in which the result of the web service included in the response message has been stored based on the conversion rule corresponding to the response message.

* * * * *